April 4, 1967

R. A. KERR ETAL 3,312,421

DELAYED RETURN DISTRIBUTOR

Filed June 7, 1965

INVENTORS
ROBERT A. KERR
STANLEY G. WICKHAM

AGENT

Curphey & Erickson

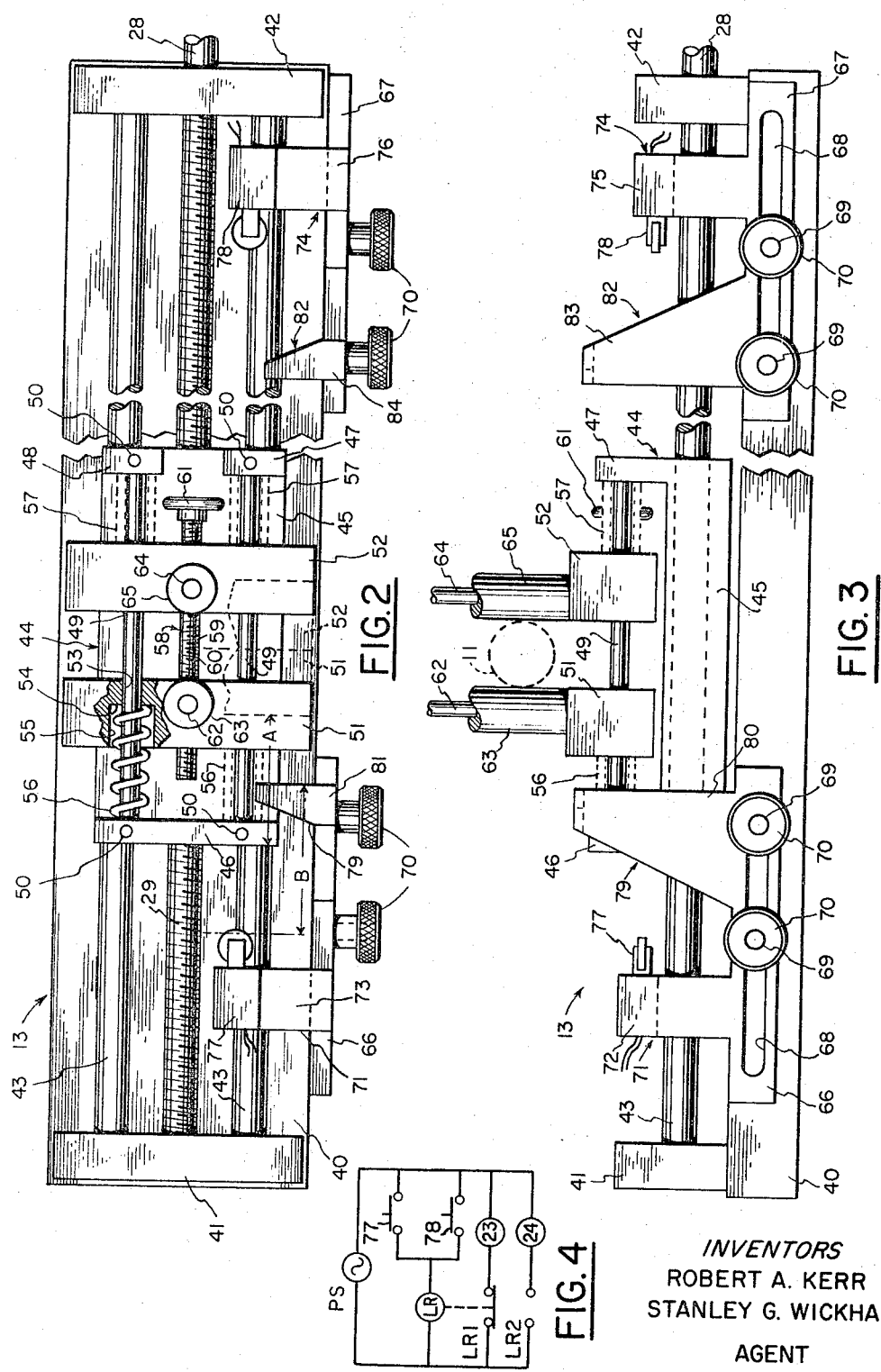

United States Patent Office 3,312,421
Patented Apr. 4, 1967

3,312,421
DELAYED RETURN DISTRIBUTOR
Robert A. Kerr, Lachine, Quebec, and Stanley G. Wickham, Montreal, Quebec, Canada, assignors to Northern Electric Company, Limited, Montreal, Quebec, Canada
Filed June 7, 1965, Ser. No. 461,991
14 Claims. (Cl. 242—158.4)

This invention relates to a machine for winding a cable upon a reel and more particularly to a machine for distributing a cable upon a reel in a closed helix without bunching or gapping of the cable adjacent to the reel flanges.

Attempts have been made to devise machines which will wind cables in closed convolutions upon cable reels. The designers of these machines have recognized the necessity of having the cable guiding means delay or dwell for an interval when the cable reaches each of the reel flanges. This has resulted in various involved arrangements for achieving such delay or dwell. Complicated means have been devised including in some instances dashpot arrangements and in others, electrical delay relays.

Prior attempts to achieve a satisfactory cable winding machine have, however, been overly complex requiring supervision by skilled personnel. The present invention achieves the desired results with a rugged machine simple in construction and emminently suitable to operation by semi-skilled personnel.

An object of this invention is to provide a relatively simple mechanism which will distribute a cable evenly from flange to flange of a take-up reel and will enable the transition from layer to layer to be accomplished without bunching or gapping of the cable.

A further object of the invention is to provide a cable winding machine which will wind a cable upon a take-up reel with a high degree of accuracy when operated by semi-skilled labour.

A further object of the invention is to provide a cable winding mechanism which, when adjusted to reels of a specific width, requires only the adjustment of two controls whenever a cable of a different diameter is to be wound upon such reels.

A further object of the invention is to provide a cable winding mechanism utilizing resilient means to cause the cable guiding carriage to delay or dwell at each end of its travel, and electrical means for causing the direction of movement of such carriage to reverse.

A further object of the invention is to provide a cable winding mechanism equipped with means to gauge precisely the dwell of the cable guiding device at each end of its travel.

A still further object of an alternative form of the invention is to provide a cable winding mechanism in which the dwell of the cable guiding means is equal to approximately 92% of a complete revoluiton of the cable take up reel.

The invention will now be described with reference to the accompanying drawings in which:

FIGURE 2 is a plan view of the distributor portion of a cable winding machine according to the invention;

FIGURE 3 is an elevational view of FIGURE 2; and

FIGURE 4 is a schematic diagram of the electrical control system for the distributor.

Figure 1:
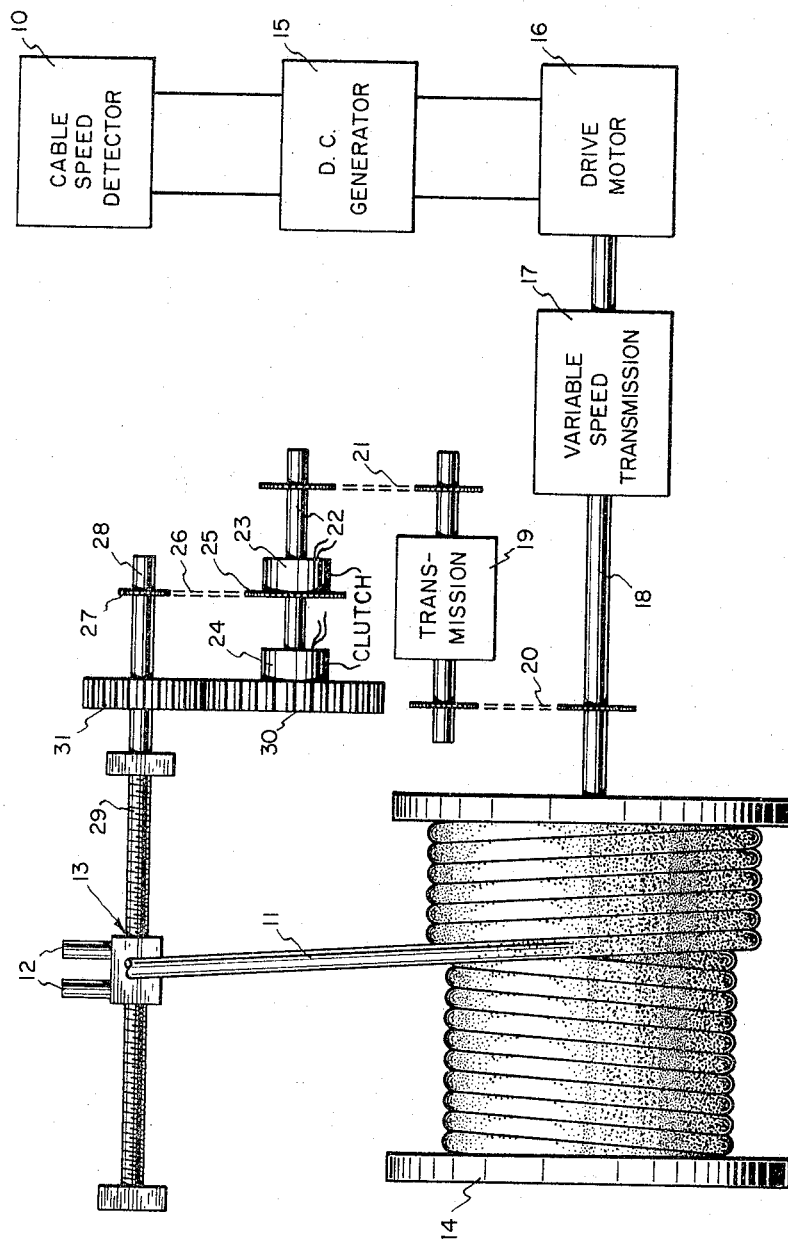
FIGURE 1 is a diagrammatic representation of the usual propulsion and control apparatus used to actuate a cable winding machine.

The usual propulsion and control apparatus for a cable winding mechanism is shown diagrammatically in FIGURE 1 and consists of a cable speed detector 10 sensitive to the speed of a cable 11 passing between the rollers 12 of a distributor mechanism 13 for distributing the cable across a reel 14 on which the cable is being wound. The speed detector 10 is connected to and controls the output of a direct current generator 15 which in turn feeds a drive motor 16. This motor is mechanically connected, through a variable speed transmission device 17 adjustable to several speed ratios in order to provide a suitable range of reel speeds for all sizes of cables which would normally be wound with the herein described machine.

The transmission device 17 is mechanically connected by means of a shaft 18 to the reel 14. A second variable transmission device 19 is coupled to the shaft 18 by any suitable means such as a chain drive 20. The transmission 19 permits accurate adjustment of the distribution speed relative to the reel speed. It is in turn coupled by a chain drive 21 to a shaft 22 which carries a pair of electric clutches 23 and 24. The clutch 23, when energized, operates a sprocket wheel 25, which, through the medium of a chain 26 drives a co-operating sprocket wheel 27 pinned to the projecting end 28 of drive screw 29 of the distributor mechanism 13. The clutch 24 when energized rotates gear 30 which engages a gear 31 also pinned to the end 28 of the screw 29. It will thus be apparent that with the motor 16 driving the reel 14 continuously in one direction, the direction of rotation of the screw 29 may be controlled by energizing one or other of the clutches 23 or 24.

FIGURES 2 and 3 illustrate in plan and elevation respectively, a distributor mechanism 13 constructed in accordance with the present invention. The distributor mechanism consists of a bed plate 40 carrying spaced supports 41 and 42. Extending between and secured to such supports are a pair of horizontally disposed spaced parallel rails 43.

Journalled in centrally positioned bearings (not shown) within the supports 41 and 42 is the drive screw 29 with its projecting end 28 protruding through the support 42. The threaded portion of the screw lying between the supports engages mating threads within a carriage 44 slidably mounted upon the rails 43. The carriage consists of a base member 45 and an integral upstanding flange 46 at the left-hand end thereof as viewed in FIGURES 2 and 3 and a pair of spaced integral flanges 47 and 48 at the corners of the right-hand end thereof. It will be apparent that when the screw 29 is rotated it will cause the carriage 44 to slide upon the rails 43 to the right or left depending upon the direction of such rotation.

Extending between the flange 46 and the flanges 47 and 48 are two spaced bars or rails 49 parallel to the rails 43. These bars are mounted in holes (not shown) within the flanges and are fixed in position by pins 50 which pass there through.

Slidably mounted upon the bars 49 are a pair of blocks 51 and 52 provided with openings 53 to receive the bars 49. The dimensions and spacing of the openings is such that the blocks are freely slidable upon the bars.

Encircling the bars 49 and interposed between the inner face of flange 46 and the shoulder 54 of a counterbore 55 in each block 51 and 52 is a compression spring 56. Similarly, compression springs 57 extend between counter-bore shoulders in block 52 and each of the flanges 47 and 48. These springs urge block 51 to the right and block 52 to the left as viewed in FIGURES 2 and 3.

Extending through aligned threaded passageways in each of the blocks 51 and 52 is an adjusting screw 58, one-half of which is right-hand threaded as at 59 and the other left-hand threaded as at 60. To one extremity thereof is affixed a manually-operable hand wheel 61 accessible through the gap between the flanges 47 and 48. As will be apparent, rotation of the hand wheel will cause the blocks 51 and 52 to advance toward or retract from one another depending upon the direction of such rotation.

Superimposed upon the upper face of block 51 is a post 62 carrying a freely rotatable roller 63. A roller 65 is similarly mounted on a post 64 projecting upwardly from the surface of block 52. These rollers co-operate and act as guides for the cable 11 shown in dotted section in FIGURE 3. Rollers 63 and 65 are aligned with the inner faces of the blocks 51 and 52 respectively, so that when the blocks are moved into contact by the screw 58, the rollers are also touching, or at least nearly so.

Secured to the side of bed-plate 40, adjacent to the extremities thereof, are a pair of stop-holders 66 and 67. Each stop-holder is provided with a horizontal slot 68 through which pass locking screws 69 equipped with knobs 70. These screws and knobs permit the stop holders to be adjusted to any position within the limits of the slots. Integrally attached to the left-hand stop-hold 66 is an inverted L shaped switch mount 71 consisting of a vertical member 72 and a horizontal member 73. Similarly the right-hand stop-holder is equipped with a switch mount 74 and vertical and horizontal members 75 and 76 respectively.

Attached to the inner edge of member 73 is a pressure actuated electric limit switch 77. This switch as shown in FIGURES 2 and 3 is actuated when depressed slightly upon contact with the outer surface of flange 46. Likewise pressure actuated switch 78 mounted on the inner edge of member 76 is actuated in a similar manner by flange 47. The purpose of the switches will be described later.

Also integrally attached to the left-hand stop holder 66 is a limit stop 79 consisting of a trapezoid-shaped vertical element 80 and a horizontally projecting finger or abutment 81. A complementarily formed limit stop 82 consisting of a vertical element 83 and a horizontal finger or abutment 84 is similarly affixed to the right-hand stop holder. These fingers 81 and 84 are so proportioned that when the carriage 44 is moved to the right or left they will be passed by the flanges 46 or 47 as the case may be, but will eventually be contacted by the outer face of one of the blocks 51 or 52 thereby arresting further movement thereof.

It is important to note that distance A as shown in FIGURE 2 being the space between the outer face of flange 46 and that of block 51, when the latter is in contact with block 52, is exactly equal to distance B also shown in FIGURE 2 as being the distance between the inner edge of the finger 81 and a vertical plane passing through the point of actuation of the switch 77. Stated in other words, if the carriage 44 bearing blocks 51 and 52 in contact with each other is shifted to the left until the outer face of block 51 meets the inner edge of finger 81, the flange 46 will just actuate the switch 77.

In like manner, the same relationship exists between the flange 47, finger 84, block 52 and switch 78.

The electrical diagram of FIGURE 4 illustrates in simplified form an arrangement whereby the clutches 22 and 24 are controlled by the operation of the limit switches 77 and 78. This control is effected through a latching relay LR of conventional construction in series with a parallel arrangement of switches 77 and 78 across the power source PS. Latching relay LR has two sets of contacts LR1 and LR2 in series with the coils of clutches 23 and 24 respectively. When switch 77 is closed momentarily by flange 46 with carriage 44 at the left end of the distributor as seen in FIGURES 2 and 3, relay LR is pulsed to close its contacts LR1 and actuate clutch 23 which results in drive screw 29 being rotated to move carriage 44 to the right. The main feature of latching relay LR is that its contact LR1 stays closed even though limit switch 77 opens as carriage 44 moves away to the right.

The movement of carriage 44 to the right continues until flange 47 closes limit switch 78. Relay LR is pulsed again to open its contacts LR1 and close contacts LR2 to de-energize clutch 23 and energize clutch 24. The rotation of drive screw 29 is thereby reversed and carriage 44 is driven to the left.

The operation of the cable winding machine is as follows:

For purposes of this explanation and with reference to FIGURE 2, the take-up reel 14 will be considered to be mounted upon shaft 18 lying parallel to rails 43 of the distributor 13 and located in a position above the figure.

Screw 58 is turned until blocks 51 and 52 meet. The drive motor 16 is then actuated and clutch 24 is energized in order to shift the carriage 44 to the left. It is stopped in such a position that an imaginary plane through the inner face of the left flange of the take-up reel 14 contains the line of contiguity between the blocks and the rollers 63 and 65. The knobs 70 are then loosened and the left-hand stop-holder 66 is moved until the edge of finger 81 contacts the block 51 at which instant the switch 77 will be tripped by the flange 46.

The carriage 44 is then shifted to the right until a plane through the inner face of the right-hand flange of the take-up reel 14 will pass through the line of contiguity of the blocks and rollers. At this point the right-hand stop-holder is moved until finger 84 contacts the block 52 at which instant the switch 78 will be tripped by flange 47. Both stop-holders are then locked into position by knobs 70.

The stop holders are thus set for a reel of a particular drum length, this length as the term is herein used meaning the distance between the inner faces of the flanges. This setting and those for other drum lengths are recorded so that when an operator determines the drum length of any reel which he is about to use he may pre-set the stop-holders accordingly.

Thereupon, the carriage 44 is shifted to the left a distance greater than one half the diameter of the cable 11 which the operator is intending to wind upon the reel. The rollers are separated by an amount equal to such diameter by means of screw 58. The carriage is again moved to the right. As motion proceeds, the block 52 will contact finger 84 and at this instant the flange 47 will be a distance equal to one half the cable diameter from the tripping position of the switch 78. This is so because in separating the rollers by one cable diameter the block 52 is moved half of the diameter nearer to the finger 84.

Motion of the carriage 44 to the right is continued until the instant when switch 78 is tripped. During the period between contact of the block 52 by finger 84 and tripping of the switch, the blocks 51 and 52, and hence the rollers which they carry, will have remained stationary because of the arresting function of finger 84. At the same time, in order that the carriage may proceed to the right, the springs 56 will be compressed against the flange 46.

The carriage is stopped at this point and the cable 11 is fed between the rollers and the end thereof is fastened to the reel drum and in contact with the inner face of the right-hand flange.

The drive motor 16 is again actuated and the transmission devices 17 and 19 are adjusted so that the carriage will advance a distance equal to one cable diameter as the reel makes a complete revolution.

As the flange 47 leaves the switch 78 it will be apparent that the blocks 51 and 52 will remain stationary under the influence of the springs 56 until the carriage has moved a distance equal to one half the cable diameter. At this point, pressure of the springs 56 will be equalized by that from opposing springs 57 and the blocks will begin to move away from finger 84.

As the carriage 44 will have moved a distance equal to one half the cable diameter without movement of the blocks 51 and 52 the reel will have made one half a revolution with the cable 11 in contact with the inner face of the right reel flange.

Thereafter as the carriage moves to the left, the cable will be wound in a contiguous helix upon the reel drum since the relationship between the carriage speed and the rotative speed of the drum has been set at one cable diameter for one drum revolution.

At the moment when the block 51 and finger 81 meet, the cable will contact the inner face of the left reel flange. Movement of the carriage will proceed to the left but that of the blocks 51 and 52 will cease because of the finger 81. Motion of the carriage will continue for a distance equal to one half the cable diameter. It will then trip the switch 77 to control the clutches 23 and 24 as described hereinbefore with respect to FIGURE 4, and thereby reverse the drive screw 29. The carriage will then proceed to the right an equal distance during which time the blocks 51 and 52 will have been held stationary. In other words, during the time for the carriage to traverse a distance equal to the cable diameter, the position of guiding rollers 63 and 65 will have remained unchanged. Since this time equals that during which the reel 14 makes a complete revolution, the cable 11 will have been maintained in contact with the left flange for a full turn of the reel before winding of the next layer proceeds. This delay or dwell of the cable 11 at the reel flange has been found necessary if uniform winding without bunching or gapping at the flanges and smooth transistion from layer to layer is to be achieved.

The carriage 44 thus reciprocates between the switches 77 and 78 and winding proceeds with the cable in contact with each flange for a full turn of the reel as each layer is completed and the next layer commenced.

It is important to note that once the limit stops 79 and 82 have been positioned for a particular reel drum length, adjustment of the spacing between rollers 63 and 65 automatically results in the correct settings between the outer faces of flange 46 and block 51 on the one hand, and between flange 47 and block 52 on the other, to achieve the proper dwell as the cable reaches each reel flange. This feature can best be explained by the use of cardinal figures. Assume that the rollers 63 and 65 have been spaced to accommodate a cable one inch in diameter. Each roller will have been shifted from the point at which it was in contact with the other (hereinafter called the mid-position) a distance of one half inch. Since distance A is equal to distance B (as shown in FIGURE 2) when the rollers are in mid-position, shifting the rollers, and hence the blocks 51 and 52 one half inch each will result in each block contacting its cooperating limit stop where, for instance, if the carriage 44 is moving to the right, the flange 47 will be one half inch from the point at which it trips switch 78. The carriage will therefore continue to the right a distance of one half inch, will trip the switch 78 and will proceed to the left one half inch while motion of the blocks and rollers has been arrested. Thus lateral motion of the rollers has ceased while the carriage 44 has travelled a total distance of one inch. The cable diameter is one inch and since the reel speed has been adjusted to revolve once for each cable diameter a complete revolution of the reel will have occurred while lateral motion of the rollers was halted.

Assuming now that another reel with the same drum length is mounted for winding a cable having a two inch diameter. The drum speed is adjusted to make a complete revolution as the carriage 14 advances two inches. The rollers 63 and 65 are each spaced one inch from mid-position. Under these conditions, with the carriage moving to the right, limit stop 82 would be reached by flange 47 at the instant when a one inch gap separates flange 47 from the tripped position of switch 78. Further progress of the blocks 51 and 52 and rollers 63 and 65 will be halted while the carriage traverses a distance of two inches—a distance equal to the diameter of the cable. As in the case with the one inch cable a complete revolution of the reel will thus have occurred while lateral motion of the rollers was halted.

Accordingly, when the limit stops have been positioned for any particular reel drum length it is necessary only to alter the roller spacing and winding speed to accommodate a cable of a different diameter.

The operation of this invention so far has been confined to a machine provided with a cable guiding means adjusted to shift a distance equal to one diameter of the cable as the take-up reel makes a full revolution. It has been found, however, that satisfactory, and in some cases even superior, results may be achieved if the stated relationship between the guiding means and reel is not strictly followed. For example, it has been determined that excellent results are obtainable if the dwell of the cable guiding means is made equal to approximately 92% of a complete revolution of the take-up reel. This is achieved by driving the cable guiding means at a speed slightly faster than normal. Under these conditions, the cable 11 will advance one diameter plus approximately 8% during each reel revolution. This results in slight spacing occurring between adjacent cable turns. While this reduces slightly the maximum reel capacity, it has the distinct advantage of virtually nullifying the insulation chafing and damage which may result from tightly wound turns.

What is claimed is:

1. A machine for winding a cable in successive layers upon a rotating reel drum, comprising guide means for distributing the cable along said drum, means for driving the reel drum and the guide means in timed relationship, means for reversing the direction of motion of the guide means, and means driven solely by said reel drum for causing the guide means to dwell at the direction reversal point for rotation of the reel drum through a predetermined angular distance independently of the time required for said rotation through said predetermined angular distance in order to ensure smooth transition of the cable from layer to layer.

2. A machine for winding a cable in successive layers upon a reel drum comprising guide means for distributing the cable along said drum, means for driving the reel drum and the guide means in timed relationship, means for reversing the direction of motion of the guide means, means for causing the guide means to dwell at the direction reversal points for rotation of the reel drum through a predetermined angular distance, and means varied by the diameter of the cable for varying the duration of said dwell in accordance with the diameter of the cable.

3. A machine for winding a cable in successive layers upon a reel drum comprising guide means for distributing the cable along said drum including spaced members for embracing the cable, means for driving the reel drum and the guide means in timed relationship, means for reversing the direction of motion of the guide means, means for causing the guide means to dwell at the direction reversal points, means for adjusting the gap between the spaced members in accordance with the diameter of the cable, and means co-operating with said gap adjusting means for maintaining a substantially fixed relationship between the duration of said dwell and the speed of revolution of the reel drum.

4. A machine for winding a cable in successive layers upon a reel drum comprising reciprocating guide means adapted to distribute the cable along said drum including spaced rollers for embracing the cable, means for driving the reel drum and the guide means in timed relationship, means for reversing the direction of motion of the guide means at selected points, means for causing the guide means to dwell at said points, means for adjusting the gap between the rollers in accordance with the diameter of the cable, and means for causing the duration of said dwell to vary directly in accordance with the roller spacing.

5. A machine for winding a cable in successive layers upon a reel drum including means for rotating said drum, and means for distributing the cable along the length of the reel drum and causing the cable to dwell at the end of the reel drum while the latter rotates through a predetermined angular distance to ensure smooth transition from one layer to the next layer, said distributing means comprising a carriage, means for driving the carriage along the reel drum in timed relation to the rotation of the latter, cable guide means resiliently mounted on the carriage for movement therewith and relative thereto, means for stopping the guide means when the cable reaches the end of the reel drum, and means for reversing the direction of movement of the carriage a predetermined distance beyond the point of dwell of the guide means, said predetermined distance being selected so that the duration of the dwell of the guide means and cable during movement of the carriage to the point of reversal and return is equal to the time for the reel drum to rotate through said predetermined angular distance.

6. A machine for winding a cable in successive layers upon a reel drum including means for rotating the reel drum and means for distributing the cable along the drum, said cable distributing means comprising means for guiding the cable onto the reel drum, carriage means for moving said cable guiding means lengthwise of the reel drum, means mounting the cable guiding means on the carriage means and adapted to permit limited movement of the cable guiding means lengthwise of the reel drum with respect to the carriage means, means for driving the carriage means in timed relation to the rotation of the reel drum, means for reversing the direction of movement of the carriage means, means for stopping the cable guiding means at the end of a layer of cable on the reel drum, and means for activating said direction reversing means after the carriage means has continued to move through a predetermined distance beyond the point at which the cable guiding means is stopped, said predetermined distance being selected so that the cable guiding means dwells at the end of the layer of cable during a predetermined angular rotation of the reel drum to ensure a smooth transition of the cable from one layer to the next.

7. A machine as defined in claim 6, said mounting means including resilient means for biasing the cable guiding means to a normal position on the carriage means, said resilient means being adapted to permit deviation of the cable guiding means during continued movement of the carriage means while the cable guiding means is stationary at the end of a layer of cable on the reel drum.

8. A machine as defined in claim 7, the cable guiding means including a pair of members between which the cable passes onto the reel drum, and means for adjusting the distance between said members lengthwise of the reel drum to closely embrace the cable passing therebetween, said means for stopping the cable guiding means and said means for activating the direction reversing means being responsive to the spacing of the members to provide the required dwell of the cable guiding means in accordance with the diameter of the cable.

9. A machine as defined in claim 7, the cable guiding means comprising a pair of members between which the cable passes onto the reel drum, the mounting means including a rail secured to the carriage means, said rail extending lengthwise of the reel drum and slidably supporting said members, an abutment carried by the carriage means on the side of each member remote from the other member, said resilient means comprising a compression spring extending between each abutment and the member adjacent thereto, screw means interconnecting said members to adjust the distance therebetween to the diameter of the cable, said means for stopping the cable guiding means being adapted to contact one of the members and being responsive to the adjusted distance between the members to provide the required dwell of the cable guiding means in accordance with the diameter of the cable.

10. A machine as defined in claim 9, said means for stopping the cable guiding means comprising an abutment.

11. A machine as defined in claim 10, said direction reversing means being electrically operated, said means for activating the direction reversing means including an electrical switch adapted to be operated by the carriage means at the end of said predetermined distance.

12. A machine as defined in claim 11, said means for driving the carriage means comprising a drive screw and a drive motor, said direction reversing means comprising a chain drive including a clutch interconnecting the drive screw and the drive motor, and a gear drive including a clutch interconnecting the drive screw and the drive motor, said clutches being selectively operable in response to operation of said switch by the carriage means to reverse the direction of rotation of the drive screw.

13. A machine as defined in claim 11, said abutment and said switch being adjustable lengthwise of the reel drum for various lengths of reel drums.

14. A machine as defined in claim 9, each of said members including a cylindrical roller.

References Cited by the Examiner
UNITED STATES PATENTS

| | | | |
|---|---|---|---|
| 1,140,924 | 5/1915 | Underhill | 242—158.4 X |
| 2,773,391 | 12/1956 | Bruestle | 242—158.4 X |
| 2,845,229 | 7/1958 | Bliss | 242—158.4 X |
| 2,912,187 | 11/1959 | Rau | 242—158.4 |

FRANK J. COHEN, *Primary Examiner.*

N. L. MINTZ, *Assistant Examiner.*